United States Patent Office 3,749,771
Patented July 31, 1973

3,749,771
ANTIVIRAL TREATMENT
William Regelson, Richmond, Va., assignor to Hercules Incorporated, Wilmington, Del.
No Drawing. Application July 10, 1970, Ser. No. 54,021, now Patent No. 3,624,218, which is a continuation-in-part of application Ser. No. 716,257, Mar. 6, 1968, which in turn is a continuation-in-part of application Ser. No. 577,675, Sept. 7, 1966, both now abandoned. Divided and this application Nov. 23, 1970, Ser. No. 92,276
Int. Cl. A61k 27/00
U.S. Cl. 424—78                                                                1 Claim

ABSTRACT OF THE DISCLOSURE

Certain water-soluble copolymers prepared from divinyl ether and maleic anhydride have been found to suppress foot-and-mouth disease virus growth in cloven-footed animals. Administration of said copolymers not only suppresses growth in infected animals but also increases resistance to virus infection in healthy animals by stimulating the production of interferon.

---

This application is a division of my copending United States application Ser. No. 54,021, filed July 10, 1970, now U.S. Pat. No. 3,624,218, which is a continuation-in-part of my copending application Ser. No. 716,257, filed Mar. 6, 1968, now abandoned, which is in turn a continuation-in-part of my application Ser. No. 577,675, filed Sept. 7, 1966, now abandoned.

This invention relates to a method of suppressing foot-and-mouth disease virus growth in cloven-footed animals. More specifically, this invention relates to a method of inhibiting or retarding foot-and-mouth disease virus growth and preventing its propagation by inactivation of the virus and/or increasing host resistance to the virus infection.

Foot-and-mouth disease is caused by a filterable virus classified into several different types. Cloven-footed animals are the natural hosts of foot-and-mouth disease virus. Cattle, oxen, pigs, goats, wild ruminants, hedgehogs, and even some rats are susceptible to natural infection. Guinea pigs, hamsters, rabbits, mice, cats and dogs may be infected experimentally, but do not usually develop the disease naturally. Animals usually are infected with the virus by direct contact with another infected animal. However, indirect contact is common due to the fact that the virus can survive for long periods outside a living animal. The incubation period after natural infection is usually between three and eight days, but can be shorter or may extend to 14 days or longer. The normal procedure for controlling an outbreak of foot-and-mouth disease is the slaughter and destruction of infected animals along with restrictions on the movements of people, animals and materials. Obviously an outbreak of the disease can cause severe economic and social problems. Vaccines have been used in some countries with varying success. However, vaccination with one type of vaccine may not be effective in preventing infection with other virus type or sub-types.

It has now surprsingly been discovered that certain water-soluble copolymers prepared from divinyl ether and maleic anhydride in mole ratios of 1:2 and their physiologically tolerated salts are effective in suppressing foot-and-mouth disease virus. These copolymers are characterized by having an RSV of from about 0.04 to about 1.8 and as having the following recurring unit:

$$\left[\begin{array}{c} -CH_2-CH \diagdown \begin{array}{c} O-CH-\\ \diagup\\ CH-CH\\ \diagup\\ O \diagup \diagdown O \diagup \diagdown O \end{array} \diagup CH_2 \diagdown \begin{array}{c} CH-CH-\\ \diagup\\ C\\ \diagup\\ O \diagup \diagdown O \diagup \diagdown O \end{array}\right]$$

It will be obvious to those skilled in the art that these copolymers will hydrolyze on contact with water to produce the free acid.

The term "Reduced Specific Viscosity" (RSV), which is a function of molecular weight, is used herein to designate the specific viscosity measured at a temperature of 25° C. on a 0.1% solution of the copolymer in a one molar aqueous solution of sodium hydroxide.

Unlike some antiviral agents, the copolymers used in this invention are relatively nontoxic. For example, when injected intraperitoneally in mice they were found to have an $LD_{50}$ of greater than 800 mg./kg. By the term "$LD_{50}$" is meant lethal dose to 50% of the animals being tested.

Most of the chemotherapeutic agents currently in use in the treatment of virus infections exert their activity through direct physical combination with the virus or by modifying the ability of the virus to attach or replicate or to be released from within the infected cell.

The exceptionally high activity of these copolymers as antiviral agents is multiple in that they are active both in vitro and in vivo. They possess in vitro viral neutralization by direct physical combination with the virus. On the other hand, they exhibit surprising in vivo activity in reducing the quantity of virus present in the injected tissue following virus infection. They also increase the resistance of healthy animals to foot-and-mouth disease virus infection on pretreatment by stimulating the reticuloendothelial system to induce the production of interferon. Interferon is a protein produced by animal and human cells which possesses antiviral activity against a wide spectrum of viral pathogens.

The copolymers can be employed in aqueous solution or dissolved in physiological sterile saline solution. In addition, various pharmaceutical preparations can be compounded which contain the active substance along with liquid or solid diluents. Solid preparations for extemperaneous dilution can be formulated employing various buffering agents as well as local anesthetics and other medicinal agents such as antibiotics, hypnotics, analgesics, etc., and inorganic salts to afford desirable pharmacological properties to the composition. Administration will be by one of the conventional intramuscular, subcutaneous, intravenous or intraperitoneal routes.

Divinyl ether-maleic anhydride copolymers can be used to treat cloven-footed animals which are actually infected with foot-and-mouth disease virus or to immunize animals which may be exposed to the virus. For example, if the disease breaks out in a herd of cattle the owner would administer the copolymer to those animals exhibiting symptoms of the disease as well as those which look healthy and owners of neighboring herds would immunize their animals because they might be exposed to the virus. Thus the copolymer acts not only as a medication, but as a prophylactic. In any case, dosages in the order of 0.5 to 300 mg./kg. daily of the copolymers are highly effective in suppressing foot-and-mouth disease virus in cloven-footed animals and in increasing resistance to the disease in healthy animals by inducing the production of interferon. The specific dosage will depend upon the route of administration and duration of treatment. Since the active copolymers are stable and widely compatible, they can be administered in solution or suspension in a variety of pharmacological acceptable vehicles including water, propylene glycol, diethylcarbonate, glycerol, or oils such as peanut oil, sesame oil, olive oil, etc.

As stated above, the physiologically tolerated salts of the copolymers can be used in the process of this invention. Exemplary salts are the water-soluble salts of alkali metals as for example sodium, potassium, etc.; ammonium salts, salts of such amines as methylamine, dimethylamine, ethylamine, diethylamine, butylamine, aniline, methoxyamine, piperidine, morpholine, etc.; mixed salts containing ammonia and a primary or secondary amine, etc.

The copolymers used in the process of this invention can be produced by copolymerizing divinyl ether and maleic anhydride in an aromatic diluent at a mole ratio of about 1:2 using a free radical initiator (e.g. benzoyl peroxide, azo bis-(isobutyronitrile), etc.). The use of chain transfer agents (i.e. $CCl_4$, $BrCCl_3$, etc.) in the copolymerization is optional.

The following example shows the preparation of a typical divinyl ether-maleic anhydride copolymer.

A polymerization vessel was charged with 197.2 parts of maleic anhydride, 704 parts of benzene and 1276 parts of carbon tetrachloride. After dissolution of the maleic anhydride, the solution was sparged with nitrogen and 70.2 parts of distilled divinyl ether was added with agitation. Then with vigorous agitation there was added 1.45 parts of benzoyl peroxide dissolved in benzene. Within 20 seconds, copolymerization started and the solution became cloudy and then gelatinous. After about 3½ hours, the swollen polymer was removed and repeatedly extracted with benzene and then dried under vacuum. The resulting divinyl ether-maleic anhydride copolymer had an RSV of 0.34 (molecular weight of approximately 36,000) and represented a conversion of 89%. The divinyl ether and maleic anhydride were present in the copolymer in the molar ratio of 1:2.

It will be understood that by conducting the copolymerization under various reaction conditions in the presence of different free radical initiators and in the presence or absence of chain transfer agents, copolymers of various molecular weights can be prepared.

The following examples are presented to illustrate the process of this invention.

EXAMPLE 1

This example illustrates the induced production of interferon by treating Swiss white mice with a divinyl ether-maleic anhydride copolymer containing divinyl ether and maleic anhydride in a 1:2 mole ratio and having an RSV of 0.34 (molecular weight of approximately 36,000). Six groups containing five mice each were all injected intraperitoneally with 125 mg./kg. body weight of the copolymer in sterile saline solution. The groups of mice were sacrificed as follows: the first group, immediately; the second after 12 hours; the third after 24 hours, the fourth after 48 hours, the fifth after 72 hours; and the sixth after 144 hours. The pooled mouse serum from each group was tested to determine the units of interferon produced according to the procedure of Kleinschmidt et al., P.N.A.S. 52: 741, 1964. The results of these tests are tabulated below along with results of control groups of five mice each injected with sterile saline solution alone:

| Hours | Units of interferon present | |
|---|---|---|
| | Mice injected with copolymer | Control |
| 0 | <10 | <10 |
| 12 | 90 | <10 |
| 24 | 159 | <10 |
| 48 | 25 | <10 |
| 72 | <20 | <10 |
| 144 | <20 | <10 |

EXAMPLE 2

This example illustrates the production of interferon using divinyl ether-maleic anhydride copolymers of varying molecular weight. Four groups of Swiss white mice containing five mice each received intraperitoneal injections of 125 mg./kg. body weight of the copolymer in sterile saline solution with each group receiving a different molecular weight copolymer. All of the mice were sacrificed 24 hours after treatment and the pooled mouse serum from each group tested to determine the units of interferon present as described above. The results of these tests are tabulated below:

| Divinyl ether-maleic anhydride molecular weight: | Units of interferon present |
|---|---|
| 17,000 | 187 |
| 40,000 | 219 |
| 110,000 | 246 |
| 450,000 | 205 |

EXAMPLE 3

This example illustrates the effectiveness of a divinyl ether-maleic anhydride copolymer containing the monomers in a 1:2 mole ratio and having an RSV of approximately 0.32 on guinea pigs infected with foot-and-mouth disease virus.

Groups of eight (8) guinea pigs, having an average weight of approximately 500 g. each, were injected intraperitoneally with 25 mg. per guinea pig of divinyl ether-maleic anhydride copolymer in 0.5 ml. of 0.9% sterile saline solution. An equal number of control guinea pigs (average weight 500 g. each) were injected intraperitonally with 0.5 ml. of 0.9% sterile saline solution. After 18 hours all the guinea pigs were challenged with 0.1 ml. of various strength serial dilutions of type O (O, BFS 1860 strain) foot-and-mouth disease virus given intradermally to the pad of the right hind foot. From approximately 48 hours after the challenge with foot-and-mouth disease virus the guinea pigs were examined for appearance of lesions at the primary site of challenge and at the secondary sites (i.e., other feet and mouth). An arbitrary scale of possible lesions was set up and the percentage of lesions observed was calculated. The results are tabulated below:

| | Percentage of positive sites after challenge with— | | | |
|---|---|---|---|---|
| | 4,000 $ID_{50}$* | 400 $ID_{50}$* | 40 $ID_{50}$* | 4 $ID_{50}$* |
| Copolymer treated guinea pigs | 77.5 | 30 | 12.5 | 5.7 |
| Control guinea pigs | 87.5 | 85 | 77.5 | 40 |

*The term $ID_{50}$ stands for an infectious dose to 50 percent of the animals being tested. Thus 4 $ID_{50}$ is 4 times the dose which would be infectious to 50 percent of the animals.

EXAMPLE 4

Example 3 was repeated except the guinea pigs were challenged with the foot-and-mouth disease virus either before treatment with divinyl ether-maleic-anhydride copolymer or simultaneously with the treatment. The results are tabulated below:

| Guinea pigs | Percentage of positive sites after challenge with— | |
|---|---|---|
| | 100 $ID_{50}$ | 10 $ID_{50}$ |
| Challenge and treatment given together | 22.5 | 32.5 |
| Treatment 24 hours after challenge | 52.5 | 55.0 |
| Control guinea pigs | 77.5 | 65.0 |

EXAMPLE 5

This example illustrates the effectiveness of a divinyl ether-maleic anhydride copolymer containing the monomers in a 1:2 mole ratio and having an RSV of approximately 0.32 on suckling mice infected with foot-and-mouth disease virus.

A stock solution of 20 milligrams per milliliter of the copolymer in sterile saline solution was adjusted to a pH of 7.2 with 6 N NaOH. Groups of ten (10) suckling mice were injected intraperitoneally with dilutions of the above described copolymer solution and at various time intervals thereafter, were challenged with 100 times the median lethal dose ($LD_{50}$( of Asia 1 type foot-and-mouth disease virus. Controls were treated exactly the same way except they were injected with saline solution in place of the copolymer solution. Ten days after virus challenge, the number of surviving mice were recorded. The amount of copolymer with which each suckling mouse was treated, the number of days after treatment the mice were challenged with foot-and-mouth disease virus, and the number of mice surviving (10 days after challenge), are tabulated below:

| Concentration of copolymer (micrograms per 5 gm. mouse) | Days after copolymer treatment that virus challenge was made | | | |
|---|---|---|---|---|
|  | 1 | 2 | 3 | 4 |
|  | Number of mice alive 10 days after virus challenge | | | |
| 600 | 3 | 10 | 10 | 6 |
| 300 | 4 | 7 | 9 | 5 |
| 150 | 1 | 8 | 5 | 3 |
| 75 | 0 | 2 | 3 | 7 |
| 37.5 | 0 | 3 | 2 | 2 |
| 0 (control) | 0 | 0 | 0 | 0 |

EXAMPLE 6

This example illustrates the effectiveness of divinyl ether-maleic anhydride copolymer on the seven major types of foot-and-mouth disease virus.

Following the procedure of Example 5, groups of twenty (20) suckling mice were injected intraperitoneally with 600 micrograms per 5 gm. mouse with the divinyl ether-maleic anhydride copolymer solution described in Example 5 and 48 hours thereafter each group was challenged with 100 times the median lethal dose of a different type foot- and mouth disease virus. Seven (7) days after virus challenge, the number of surviving mice was recorded. Groups of ten (10) suckling mice were used as controls and treated exactly the same way except they were injected intraperitoneally with saline solution in place of the copolymer solution. The types of foot-and-mouth disease virus used to challenge the mice and the number of mice alive seven days after the challenge (expressed as a fraction of the total treated) are tabulated below:

| Type of foot-and-mouth disease virus | 7th day survival | |
|---|---|---|
|  | Copolymer treated | Controls |
| SAT 1 | 10/20 | 0/10 |
| SAT 2 | 17/20 | 0/10 |
| SAT 3 | 19/20 | 0/10 |
| Asia 1 | 19/20 | 0/10 |
| A | 5/20 | 0/10 |
| C | 10/20 | 0/10 |
| O | 15/20 | 0/10 |

What I claim and desire to protect by Letters Patent is:

1. A process of immunizing a cloven-footed animal exposed to but not infected with foot-and-mouth disease virus which comprises administering to said animal within fourteen days of said exposure at least one dosage of from about 0.5 to 300 mg./kg. of body weight of an antiviral agent selected from divinyl ether-maleic anhydric copolymers and physiologically tolerated salts of divinyl ether-maleic anhydride copolymers, said copolymers containing divinyl ether and maleic anhydride in a mole ratio of about 1:2 and having a reduced specific viscosity of from about 0.04 to about 1.8.

No references cited.

RICHARD L. HUFF, Primary Examiner

U.S. Cl. X.R.

424—85